June 17, 1924.

D. O'KEEFFE

WEIGHING SCALE

Filed Jan. 22, 1923

1,498,112

Inventor:
Daniel O'Keeffe
By Macleod, Calver, Copeland & Dike
Attorneys.

Patented June 17, 1924.

1,498,112

UNITED STATES PATENT OFFICE.

DANIEL O'KEEFFE, OF BOSTON, MASSACHUSETTS.

WEIGHING SCALE.

Application filed January 22, 1923. Serial No. 614,092.

*To all whom it may concern:*

Be it known that I, DANIEL O'KEEFFE, a citizen of the United States, residing at Boston, county of Suffolk, Commonwealth of Massachusetts, have invented a certain new and useful Improvement in Weighing Scales, of which the following is a specification, reference being had therein to the accompanying drawings.

The invention relates to the cylinder or barrel type of weighing scales, in which there is a rotary cylinder which is rotated by the weight of the goods through a greater or less arc according to the weight of the goods in the scale pan, the cylinder having scale marks thereon which indicate through the reading opening the weight of the goods.

In machines of this cylinder type heretofore made, so far as I am aware, the chart showing the weight has been wound around the periphery of the cylinder and the figures are exposed through a slot at the front and back of the machine, so that the figures can be read only when the person is standing at the front or back of the machine. In this type of machine the scale pan is on the front side of the machine and extends parallel with the cylinder. In many cases it is customary for the person weighing goods to stand at the end of the machine, that is, at the end of the scale pan instead of at the front, this being more convenient in putting the goods into the scale pan. This is especially true when, as is often the case, two persons are working at the same time weighing on the same scale and they stand at the two opposite ends of the scale pan so as not to interfere with each other. In such position it is difficult for them to read the weight of the goods if the scale figures are shown only at the front or rear, and they can only do so by changing position or leaning over toward the front of the machine, thus making a delay in their work.

The object of the present invention is to provide means whereby the weight may be easily read, not only at the front and rear of the machine but at the two ends.

The invention will be fully understood from the following description when taken in connection with the accompanying drawings, and the novel features thereof will be pointed out and clearly defined in the claims at the close of this specification.

In the drawings, Fig. 1 is a front elevation partly broken away of a machine embodying the invention, some of the unessential parts being omitted.

Figure 3:
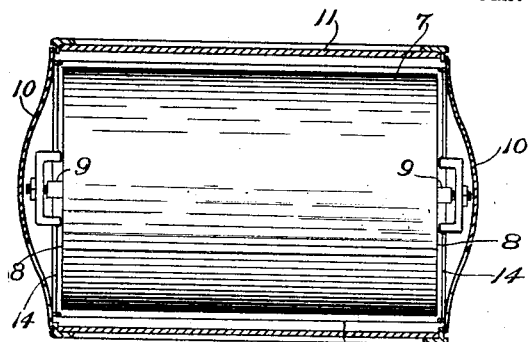
Fig. 3 is a horizontal view partly in section of the cylinder of the machine embodying the invention.

Referring now to the drawings, 1—1 are the upright standards of the frame, and 2 the base of the machine, 3 the beam, and 4 the yoke pivotally supported on the beam in which is held the scale pan 5, the said beam being fulcrumed in the yoke 6 mounted on the base, all of well-known form of construction. The scale pan extends across the front side of the machine. A rotary cylinder 7 is provided with a shaft 9 by which it is journalled in the heads 10 of a non-rotatable case 11. Suitable mechanism is provided in connection with the scale beam and the said cylinder, whereby when any load is placed in the scale pan said cylinder 7 will be caused to rotate in one direction through an arc depending upon the weight of the goods, and then when the goods are removed from the scale pan the said cylinder will turn back to its normal position. Mechanism for accomplishing this is well known and shown in some of the scales now on the market, and it is not deemed necessary to show the same in detail.

Wrapped around the periphery of the cylinder is a chart 12 with a series of figures extending circumferentially around the periphery of the cylinder for indicating the weight. The casing is formed with a slot 13 extending longitudinally thereof and forms a sight opening. This slot or sight opening is so placed that when the cylinder 7 is rotated by the weight of the goods in the scale pan, the particular figure on the chart 12, indicating the correct weight, will be exposed in the sight opening. A fixed horizontal sight line 14 extends horizontally across the sight opening 13. As the machine is shown in the drawings, the scale pan is empty and the weight mark zero on the chart is in horizontal alignment with the sight line. The cylinder 7 is supposed to revolve from the front up and over in clockwise direction, as viewed from the right-hand end of the machine. The chart, as shown in the drawings, is arranged to indicate weight up to sixteen pounds, the figure 16 shown through the slot in Figure 1 being as will be observed above the sight line. If goods to the amount of sixteen pounds are placed in the scale pan, the cylinder 7 will revolve up and over and around until the 16 comes up on the under side, until it coincides with the sight line 14. If only twelve pounds are placed in the scale pan, it will revolve only sufficiently to bring the figure 12 up against the sight line.

Figure 4:
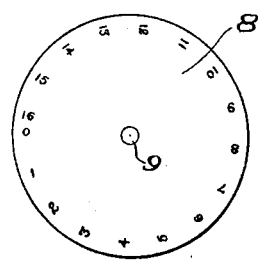
Fig. 4 is an end view of one of the dials which are mounted on the ends of the rotary cylinder, the dials being graduated to indicate weight.

Each end of the rotary cylinder has a disk dial 8 having arranged thereon a series of figures in circular arrangement, after the manner of the dial of a clock, as shown in Figure 4, running from 1 to 16, and the spaces between them may be graduated to indicate fractions of pounds, as desired. The graduations in figures on the dials 8 will correspond in elevation with the weight-indicating figures on the chart 12 around the periphery. The two heads 10 of the case are each formed with a sight opening 15 through which the proper figure on the dial 8 to indicate the weight will be exposed corresponding with the weight figure on the chart 12 shown through the front slot 13; that is, if the figure 16 is shown through the front slot 13 in alignment with the sight line 14, then the figure 16 will be shown on the two end dials through the reading slots 15. The sight line 14 should be carried around diametrically across the ends of the cylinder in front of the dials 8 on the same level with the front portion of the sight line 14, so that the weight figures on the dials at the ends will be in alignment with the sight lines 14 at the end, while the corresponding weight figure on the chart 12 at the front is in alignment with the front sight line.

Figure 1:
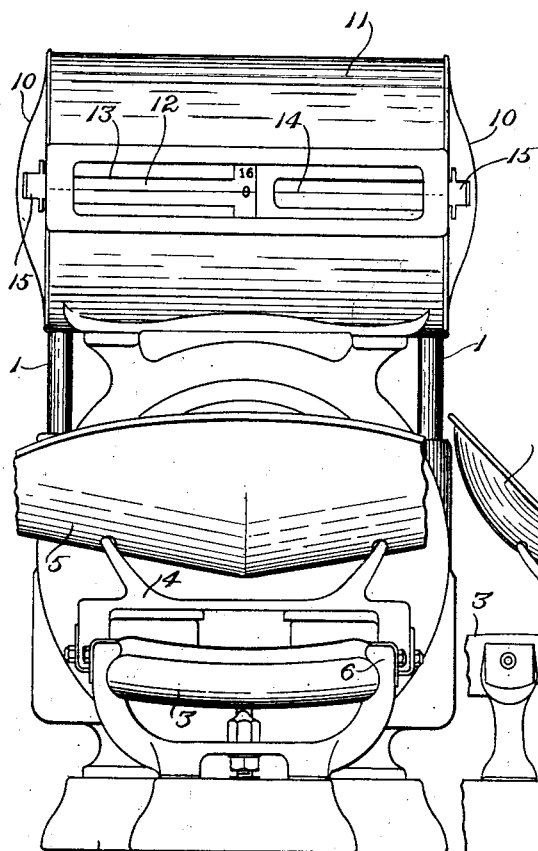
Figure 2:
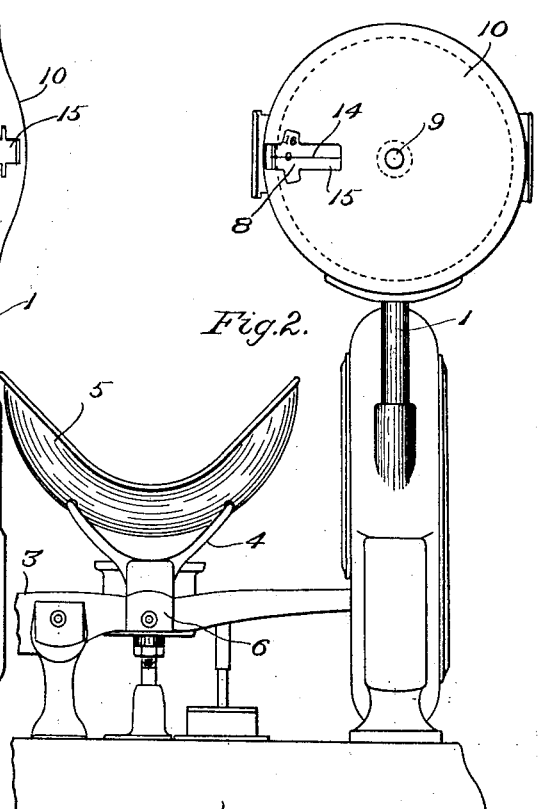
Fig. 2 is an end view of the machine shown in Fig. 1.

If two clerks are employed at the same time in putting up goods, one will stand on the right-hand side of the machine, as viewed in Figure 1, and the other will stand on the left-hand side; or if only one is employed, he will stand either at the front or on either of said two sides that is convenient. Each workman is in position to observe at his end of the cylinder the graduation marks on the end dial as the cylinder and dial revolve, so that, without changing his position, each can determine when the figure, indicating the desired weight of goods, comes in line with the sight line 14 through the sight opening 15 at his end.

What I claim is:

1. In a weighing scale mechanism, the combination of a rotary cylinder having a chart extending circumferentially of the periphery thereof, having a series of graduating marks around its periphery graduated to indicate the weight in accordance with the arc of rotation of the cylinder, as actuated by the weight of the goods in the scale, each end of the cylinder having a dial with a series of graduating marks thereon in circular arrangement to indicate the weight corresponding to the weight graduations on the periphery, the several graduating marks on said end dials being at the same level as the corresponding graduating marks on the periphery, whereby like weight notations will appear in alignment with one another at the front and at each end at the same time.

2. In a weighing scale mechanism, the combination of a rotary cylinder having a chart extending circumferentially of the periphery thereof, having a series of graduating marks around its periphery graduated to indicate the weight in accordance with the arc of rotation of the cylinder, as actuated by the weight of the goods in the scale, each end of the cylinder having a dial with a series of graduating marks thereon in circular arrangement to indicate the weight corresponding to the weight graduations on the periphery, the several graduating marks in said end dials being at the same level as the corresponding graduating marks on the periphery, whereby like weight notations will appear in alignment with one another at the front and at each end at the same time, and a fixed guide mark at the front and each end which indicates the positions of the correct readings on the dial.

3. In a weighing scale mechanism, the combination of a rotary cylinder having a chart extending circumferentially of the periphery thereof, having a series of graduating marks arranged circumferentially around the periphery thereof intermediate its ends graduated to indicate the weight in accordance with the arc of rotation of the cylinder, as actuated by the weight of the goods in the scale, each end of the cylinder having a series of graduating marks thereon in circular arrangement to also indicate weight corresponding to the weight graduations on the periphery, the several graduating marks on each end being at the same level as the corresponding graduating marks on the periphery, graduating marks being alike on both ends and on the periphery, a casing for said cylinder having a reading slot extending horizontally thereof parallel with the axis of the cylinder, a reading slot at each end of the casing, all of said reading slots being so arranged that like weight notations will be simultaneously visible through the reading slot at the front and through the reading slots at the two ends, and means whereby the tipping of the scale by the weight of goods being weighed will rotate the said cylinder so that the same amount of the weight of goods on the scale will appear at the same time at the several reading openings.

4. In a weighing scale mechanism, the combination of a rotary cylinder having a chart extending circumferentially of the periphery thereof intermediate its ends, graduated to indicate weight, each end of the cylinder having graduations thereon in circular arrangement to also indicate weight corresponding with the weight graduations on the periphery, a casing for said cylinder having a reading slot extending lengthwise of the cylinder, each end of the casing having a reading slot through which the weight figures on the ends of the cylinder may be observed, a fixed, horizontal, visible guide mark extending in a lengthwise direction of the front slots and of the two end slots in the casing between the casing and the cylinder, and located intermediate the upper and lower edges of said slots, said reading slots being so arranged that the corresponding weight notations will be simultaneously visible through the reading slot at the front and through the reading slots at the two ends, and means whereby the tipping of the scale by the weight of goods being weighed will rotate the said cylinder according to the weight of the goods, so that the amount of the weight of goods on the scale will appear at the several reading openings at the level of said guide mark.

5. In a weighing scale mechanism, the combination of a rotary cylinder having a chart extending circumferentially of the periphery thereof, and having a series of graduating marks arranged circumferentially around the periphery thereof intermediate its ends, graduated to indicate the weight in accordance with the arc of rotation of the cylinder as actuated by the weight of the goods in the scale, each end of the cylinder having a series of graduating marks thereon in circular arrangement to indicate weight corresponding to the weight graduations on the periphery, the several graduating marks on the end being at the same level as the corresponding graduating marks on the periphery, a casing for said cylinder having a reading slot extending horizontally thereof parallel with the axis of the cylinder, each end of the casing having a reading slot, a fixed, horizontal, visible guide mark extending in a lengthwise direction of the front slots and of the two end slots in the casing between the casing and the cylinder, and located intermediate the upper and lower edges of said slots, said reading slots being so arranged that the corresponding weight notations will be simultaneously visible through the reading slot at the front and through the reading slots at the two ends at the level of said guide mark.

6. In a weighing scale mechanism, the combination of a rotary cylinder having a chart extending circumferentially of the periphery thereof, and having a series of graduating marks arranged circumferentially around the periphery thereof intermediate its ends graduated to indicate the weight in accordance with the arc of rotation of the cylinder, as actuated by the weight of the goods in the scale, each end of the cylinder having a series of graduating marks thereon in circular arrangement to also indicate weight corresponding to the weight graduations on the periphery, the several graduating marks on the end being at the same level as the corresponding graduating marks on the periphery, a casing for said cylinder having a reading slot extending horizontally thereof parallel with the axis of the cylinder, each end of the casing having a reading slot, a fixed, horizontal, visible guide mark extending in a lengthwise direction of the front slots and of the two end slots in the casing between the casing and the cylinder, and located intermediate the upper and lower edges of said slots, said reading slots being so arranged that the corresponding weight notations will be simultaneously visible through the reading slot at the front and through the reading slots at the two ends, and means whereby the tipping of the scale by the weight of goods being weighed will rotate the said cylinder so that the amount of the weight of goods on the scale will appear at the several reading openings at the level of said guide mark.

In testimony whereof I affix my signature.

DANIEL O'KEEFFE.